(12) United States Patent
Yuda

(10) Patent No.: US 10,155,502 B2
(45) Date of Patent: Dec. 18, 2018

(54) AIRFLOW-DIRECTION ADJUSTMENT DEVICE

(71) Applicant: NIFCO INC., Yokosuka-shi, Kanagawa (JP)

(72) Inventor: Shuichi Yuda, Yokosuka (JP)

(73) Assignee: NIFCO INC., Yokosuka-Shi, Kanagawa (JP)

(*) Notice: Subject to any disclaimer, the term of this patent is extended or adjusted under 35 U.S.C. 154(b) by 96 days.

(21) Appl. No.: 15/107,669

(22) PCT Filed: Dec. 22, 2014

(86) PCT No.: PCT/JP2014/083976
§ 371 (c)(1),
(2) Date: Jun. 23, 2016

(87) PCT Pub. No.: WO2015/098877
PCT Pub. Date: Jul. 2, 2015

(65) Prior Publication Data
US 2016/0325714 A1    Nov. 10, 2016

(30) Foreign Application Priority Data
Dec. 24, 2013   (JP) .................................. 2013-265841

(51) Int. Cl.
*B60S 1/52*    (2006.01)
*B05B 1/10*    (2006.01)
(Continued)

(52) U.S. Cl.
CPC ............... *B60S 1/52* (2013.01); *B05B 1/042* (2013.01); *B05B 1/10* (2013.01); *B05B 1/341* (2013.01); *B05B 1/3415* (2013.01); *B60S 1/50* (2013.01)

(58) Field of Classification Search
CPC ... B60S 1/52; B05B 1/10; B05B 1/042; B05B 1/341; B05B 1/3415; B05B 1/262; B05B 1/267; B05B 1/3405
(Continued)

(56) References Cited

U.S. PATENT DOCUMENTS 2,999,648 A * 9/1961 Wahlin .................. B05B 1/3415
                                                                239/463
5,743,468 A    4/1998 Laidler
(Continued)

FOREIGN PATENT DOCUMENTS

CN    1180340 A    4/1998
EP    0883557 A1   12/1998
(Continued)

OTHER PUBLICATIONS

Europe Patent Office, "Search Report for European Patent Application No. 14875729.7," dated Sep. 14, 2017.
(Continued)

*Primary Examiner* — Jason J Boeckmann
(74) *Attorney, Agent, or Firm* — Manabu Kanesaka

(57) ABSTRACT

The present invention is a spray nozzle including a nozzle having a supply port receiving liquid and a spray orifice through which liquid is sprayed, wherein the nozzle is made by combining a plurality of nozzle-divided bodies, each of the plurality of nozzle-divided bodies having a vane element integrally formed therein to rotate the liquid provided from the supply port.

11 Claims, 8 Drawing Sheets

(51) Int. Cl.
*B05B 1/04* (2006.01)
*B05B 1/34* (2006.01)
*B60S 1/50* (2006.01)

(58) Field of Classification Search
USPC ............ 239/463, 284.1, 487, 486, 501, 589,
239/589.1, 518, 524, 504, 505
See application file for complete search history.

(56) References Cited

U.S. PATENT DOCUMENTS

| | | | |
|---|---|---|---|
| 5,975,431 A * | 11/1999 | Harita | B60S 1/52 15/322 |
| 6,354,515 B1 | 3/2002 | Matsumoto et al. | |
| 6,969,015 B1 * | 11/2005 | Salmela | B05B 1/042 222/282 |
| 7,316,362 B2 | 1/2008 | Miyauchi | |
| 7,775,456 B2 * | 8/2010 | Gopalan | B05B 1/08 137/809 |
| 9,027,854 B2 | 5/2015 | Moser et al. | |
| 2004/0227016 A1 | 11/2004 | Yagi et al. | |
| 2005/0195239 A1 | 9/2005 | Jenkins et al. | |
| 2006/0043110 A1 * | 3/2006 | Miyauchi | B05B 1/08 222/129.1 |

FOREIGN PATENT DOCUMENTS

| | | |
|---|---|---|
| EP | 1629896 A1 | 3/2006 |
| JP | S48-16504 Y1 | 5/1973 |
| JP | S55-177869 U | 12/1980 |
| JP | S56-69959 U | 6/1981 |
| JP | S58-171250 U | 11/1983 |
| JP | 2527677 Y2 | 3/1997 |
| JP | H09-155266 A | 6/1997 |
| JP | H10-192742 A | 7/1998 |
| JP | 2001-010452 A | 1/2001 |
| JP | 2001-179626 A | 7/2001 |
| JP | 2003-175344 A | 6/2003 |
| JP | 3104320 U | 9/2004 |
| JP | 2005-46769 A | 2/2005 |
| JP | 2005-81318 A | 3/2005 |
| JP | 2005-230820 A | 9/2005 |
| JP | 2006-218452 A | 8/2006 |
| WO | 2007/101557 A2 | 9/2007 |

OTHER PUBLICATIONS

Japan Patent Office, "Office Action for Japanese Patent Application No. 2015-554899," dated May 23, 2017.
China Patent Office, "Office Action for Chinese Patent Application No. 201480071033.3," dated Apr. 20, 2017.
PCT International Search Report of PCT/JP2014/083976.

* cited by examiner

AIRFLOW-DIRECTION ADJUSTMENT DEVICE

RELATED APPLICATIONS

The present application is National Phase of International Application No. PCT/JP2014/083976 filed Dec. 22, 2014, and claims priority from Japanese Application No. 2013-265841, filed Dec. 24, 2013, the disclosure of which is hereby incorporated by reference herein in its entirety.

TECHNICAL FIELD

The present invention relates to a spray nozzle spraying liquid in a burst manner, and more particularly, relates to a spray nozzle spraying cleaning liquid in a burst manner in order to clean a windscreen for a vehicle.

BACKGROUND ART

First, a full-cone nozzle is known as a conventional spray nozzle. This is a spray nozzle having a vane-shaped component called "vane" disposed in a flow path before a spray orifice so as to generate a swirling flow, and spraying and dispersing liquid over a wide angle in a cone shape vertically and horizontally for 360 degrees.

A spray nozzle of a self-oscillation type has been developed. This is made by forming a water channel calculated in a hydrodynamic manner in a plate-like component called chip, and press-fitting the chip to the main body. A structure of a plate-like component divided to upper and lower portions has also been suggested (Japanese Patent-Laid-Open No. 2005-81318).

Further, a spray nozzle of a ball jet type is known. This is made by making a spherical penetration hole in a metal component and press-fitting the metal component into the main body.

SUMMARY OF INVENTION

In general, in a full-cone nozzle, a component serving as a "vane" is small, and therefore, assembly performance is low. In addition, there is a problem in that a water particle of liquid dispersed and sprayed over a side angle is small.

A self-oscillation type spray nozzle can achieve superior liquid spray performance, but a high level of know-how is needed to design a water channel, and in production (usually, formed with resin), a high level of dimensional accuracy is required. Because of the configuration of press fitting a chip, the water channel may be affected due to a crack and distortion of the chip, and in such case, performance degradation may be a problem.

In the spray nozzle of a ball jet type, a penetration hole of a metal component is in a spherical shape, and therefore, there is an advantage in that the degree of freedom in angle adjustment is high. However, it is difficult to finely adjust the angle, and there is a drawback in that a spray orifice is easily clogged.

The present invention is created on the basis of the above findings. It is an object of the present invention to provide a spray nozzle capable of providing high liquid spray performance that can be achieved with, like the spray nozzle of the self-oscillation type, and capable of achieving high assembly performance and formability.

The present invention is a spray nozzle comprising a nozzle including a supply port receiving liquid and a spray orifice through which liquid is sprayed, wherein the nozzle is made by combining a plurality of nozzle-divided bodies, each of the plurality of nozzle-divided bodies has a vane element integrally formed therein to rotate the liquid provided from the supply port.

According to the present invention, the liquid is rotated by the vane element, and the high liquid spray performance is achieved, and on the other hand, the nozzle is made by combining multiple nozzle-divided bodies, and therefore, the assembly performance is significantly higher than the conventional full-cone nozzle. Further, in design, a high level of know-how is not required as compared with the conventional self-oscillation type spray nozzle, and in addition, the design is easy, and in terms of formability, a high level of precision is not required as compared with the conventional self-oscillation type spray nozzle, and therefore, the formability is high.

Further, each of the nozzle-divided bodies is preferably provided with a flat surface portion at a forward side of the spray orifice element to extend in a horizontal direction. In this case, the dispersion of the liquid in the vertical direction can be suppressed, and the liquid spray can be effectively concentrated in the horizontal direction. In this case, further, a groove or a rib pattern is preferably formed on the flat surface portion. Due to the setting of the pattern of the groove or the rib, the liquid spray can be concentrated in a desired direction and on a portion. The particle diameter of the liquid can be increased, and the detergency can be increased.

For the convenience during assembly of multiple nozzle-divided bodies, for example, one of the nozzle-divided bodies is preferably formed with one of a projection portion and a recessed portion capable of engaging with each other, and the other of the nozzle-divided body is preferably formed with the other of the projection portion and the recessed portion.

Further, in a specific aspect, each of the plurality of nozzle-divided bodies is preferably provided with a flow path element extending linearly from the supply port to the spray orifice, and the vane element preferably has a blocking portion extending to block the flow path element and a penetrating portion provided in the blocking portion. In this case, depending on the shape of the penetrating portion provided in the blocking portion, the mode of the liquid spray is determined to be a desired mode. More specifically, for example, in a case where the blocking portion extends obliquely with respect to the direction of the flow path element in order to make fluid flowing along the blocking portion into a swirling flow, the penetrating portion preferably extends to cross the blocking portion.

In the aspect in which the nozzle is attached to the nozzle body, for the convenience during assembly of the nozzle and the nozzle body, for example, one of the nozzle body and the nozzle is preferably formed with one of an engagement portion and an engagement receiving portion capable of engaging with each other, and the other of the nozzle body and the nozzle is preferably formed with the other of the engagement portion and the engagement receiving portion. Alternatively, one of the nozzle body and the nozzle is preferably formed with one of a welding portion and a welding receiving portion capable of being welded with each other, and the other of the nozzle body and the nozzle is preferably formed with the other of the welding portion and the welding receiving portion.

BRIEF DESCRIPTION OF DRAWINGS

FIG. 1(a) is a front view. FIG. 1(b) is a right side view. FIG. 1(c) is a bottom view.

FIGS. 2(a) to 2(d) are oblique perspective views illustrating the nozzle-divided body of FIGS. 1(a) to 1(c), wherein FIGS. 2(a) to 2(d) are oblique perspective views seen from four directions.

FIG. 3(a) is a front view, FIG. 3(b) is a right side view, and FIG. 3(c) is a bottom view.

FIG. 4(a) is a front view, FIG. 4(b) is a right side view, FIG. 4(c) is a bottom view, and FIG. 4(d) is a cross sectional view taken along line A-A of FIG. 4(a).

FIG. 8(a) is an oblique perspective view, FIG. 8(b) is a vertical cross-sectional view, and FIG. 8(c) is an exploded view.

DESCRIPTION OF THE EMBODIMENTS

Embodiments of the present invention will be hereinafter explained in details with reference to appended drawings.

Figure 1A:
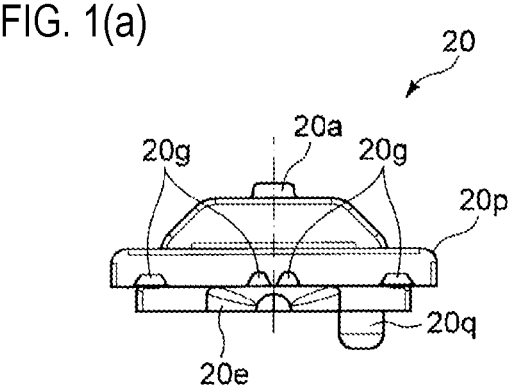
FIGS. 1(a) to 1(c) are figures illustrating a nozzle-divided body of a spray nozzle according to an embodiment of the present invention.
Figure 1B:
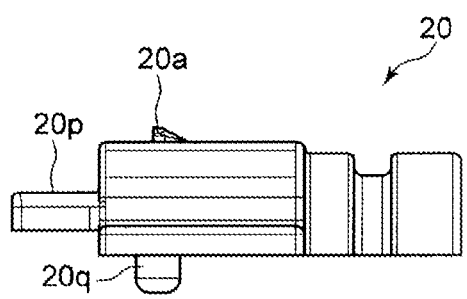
Figure 1C:
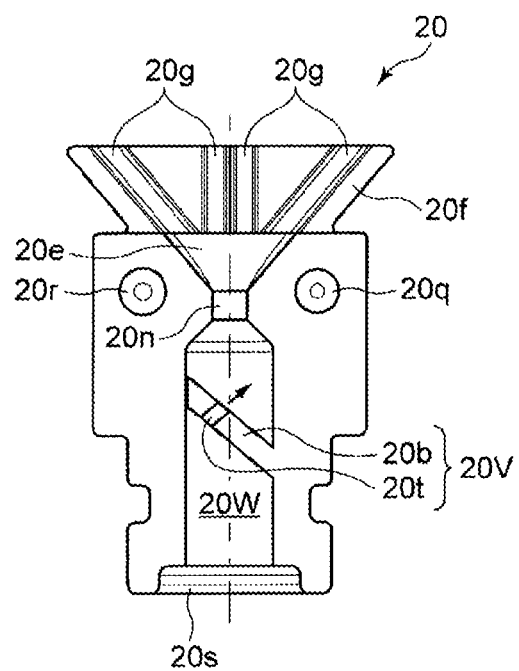
Figure 2A:
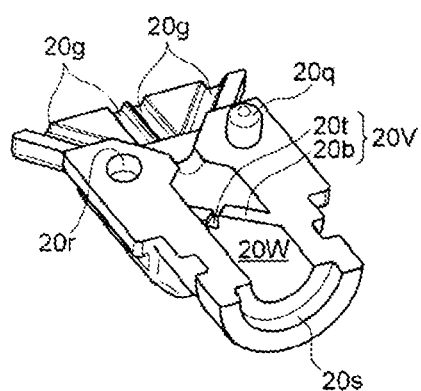
Figure 2B:
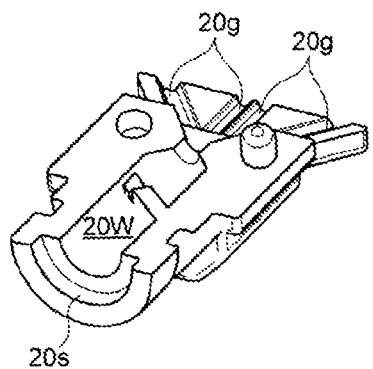
Figure 2C:
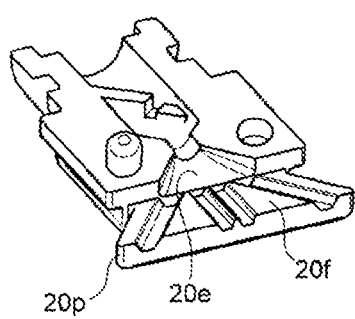
Figure 2D:
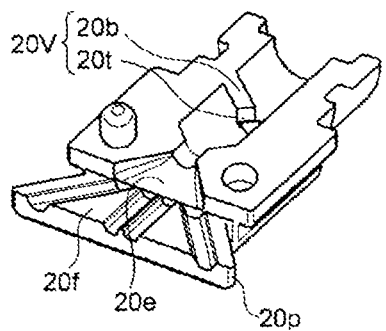
Figure 3A:
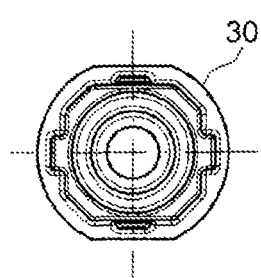
FIGS. 3(a) to 3(c) are figures illustrating a nozzle body according to an embodiment of the present invention.
Figure 3B:
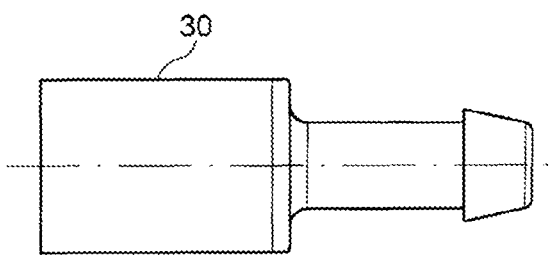
Figure 3C:
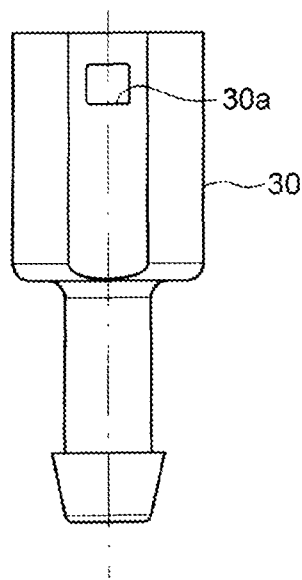
Figure 4A:
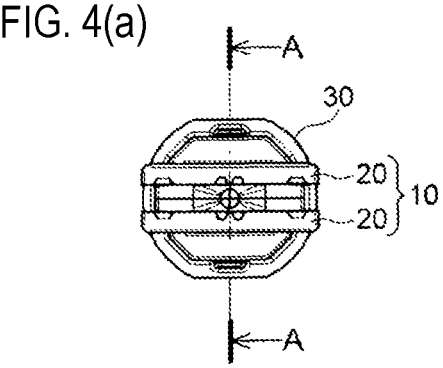
FIGS. 4(a) to 4(d) are figures illustrating a spray nozzle according to an embodiment of the present invention obtained by assembling the two nozzle-divided bodies as illustrated in FIGS. 1(a) to 1(c) and FIGS. 2(a) to 2(d) and the nozzle body as illustrated in FIGS. 2(a) to 2(d).
Figure 4B:
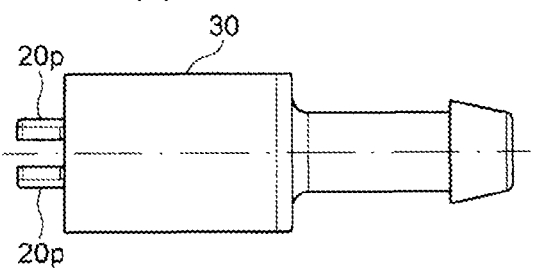
Figure 4C:
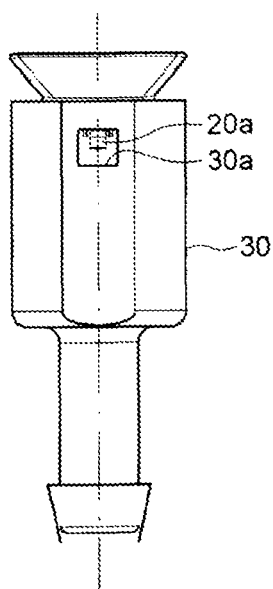
Figure 4D:
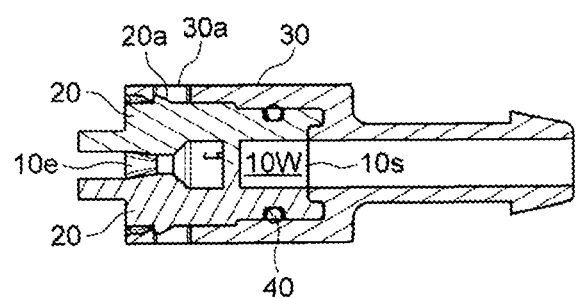

FIGS. 1(a) to 1(c) are three side views illustrating a nozzle-divided body of a spray nozzle according to an embodiment of the present invention. FIG. 1(a) is a front view. FIG. 1(b) is a right side view. FIG. 1(c) is a bottom view. FIGS. 2(a) to 2(d) are oblique perspective views illustrating the nozzle-divided body of FIGS. 1(a) to 1(c). FIGS. 2(a) to 2(d) are oblique perspective views seen from four directions. FIGS. 3(a) to 3(c) are three side views illustrating a nozzle body according to an embodiment of the present invention. FIG. 3(a) is a front view, FIG. 3(b) is a right side view, and FIG. 3(c) is a bottom view. FIGS. 4(a) to 4(d) are figures illustrating a spray nozzle according to an embodiment of the present invention obtained by assembling the two nozzle-divided bodies as illustrated in FIGS. 1(a) to 1(c) and FIGS. 2(a) to 2(d) and the nozzle body as illustrated in FIGS. 3(a) to 3(c). FIG. 4(a) is a front view, FIG. 4(b) is a right side view, FIG. 4(c) is a bottom view, and FIG. 4(d) is a cross sectional view taken along line A-A of FIG. 4(a).

As illustrated in FIGS. 1(a) to 1(c) and FIGS. 2(a) to 2(d), a nozzle-divided body 20 of a spray nozzle according to an embodiment of the present invention has a shape obtained by dividing a nozzle 10 into two parts in the vertical direction so that the two parts have the same shape with each other. More specifically, as illustrated in FIGS. 4(a) to 4(d), the nozzle 10 can be constituted by combining the two nozzle-divided bodies 20 in the vertical direction.

As illustrated in FIGS. 4(a) to 4(d), the nozzle 10 constituted by the two nozzle-divided bodies 20 includes a supply port 10s provided with liquid such as, cleaning liquid, for cleaning a windscreen for a vehicle, a spray orifice 10e through which the liquid is sprayed, and a flow path 10w guiding the liquid from the supply port 10s to the spray orifice 10e.

In association with this, as illustrated in FIGS. 1(a) to 1(c), each of the nozzle-divided bodies 20 includes a supply port element 20s corresponding to the supply port 10s and divided into two parts in the vertical direction, a spray orifice element 20e corresponding to the spray orifice 10e divided into two parts in the vertical direction, and a flow path element 20w corresponding to the flow path 10w divided into two parts in the vertical direction.

In the present embodiment, as illustrated in FIGS. 1(a) to 1(c), the supply port element 20s is a substantially semi-circular opening, the spray orifice element 20e is an opening having a shape of a half of a substantially conical shape that has been crushed to be flat, and the flow path element 20w is a substantially semi-cylindrical groove channel extending in a straight line manner and having a diaphragm portion 20n and a blocking portion 20b on its way.

As illustrated in FIGS. 1(a) to 1(c), the blocking portion 20b extends obliquely with respect to the direction of the flow path 10w in order to block the liquid flowing in the flow path 10w formed by combining the flow path elements 20w and make fluid flowing along the blocking portion 20b into a swirling flow. A penetrating portion 20t is provided to cross the blocking portion 20b (see arrow in FIGS. 1(a) to 1(c)). The vane element 20v is constituted by the blocking portion 20b and the penetrating portion 20t.

As illustrated in FIGS. 1(a) to 1(c) and FIGS. 2(a) to 2(d), the nozzle-divided body 20 is provided with a flat surface portion 20p at the forward side of the spray orifice element 20e. The flat surface portion 20p provides a flat surface portion 20f extending in the horizontal direction. The flat surface portion 20f is provided with four groove patterns 20g (which can also be a rib pattern) guiding the sprayed liquid.

In addition, the nozzle-divided body 20 according to the present embodiment is formed with a projection portion 20q and a recessed portion 20r capable of engaging with each other, and the two upper and lower nozzle-divided bodies 20 can be easily assembled by engaging the projection portion 20q and the recessed portion 20r with each other.

The two nozzle-divided bodies 20 assembled in the vertical direction are assembled in the nozzle body 30 as illustrated in FIGS. 3(a)-3(c) as the nozzle 10, and is made into a spray nozzle as illustrated in FIGS. 4(a) to 4(d). More specifically, the nozzle 10 (the two nozzle-divided bodies 20) and the nozzle body 30 can be easily assembled by engaging the engagement protrusion 20a of the nozzle-divided body 20 with the engagement receiving hole 30a of the nozzle body 30 while an O ring 40 is imposed therebetween.

According to the present embodiment as described above, a high liquid spray performance is achieved by spraying the liquid while the liquid is rotated by the vane element 20v (the blocking portion 20b and the penetrating portion 20t).

On the other hand, since the nozzle 10 is made by combining the two nozzle-divided bodies 20 in the vertical direction, the assembly performance is much better than a conventional full-cone nozzle. In design, a high level of know-how is not required as compared with the conventional self-oscillation type spray nozzle, and therefore, the design is easy. For example, a liquid spray mode can be easily adjusted to a desired mode in accordance with the shape of the penetrating portion 20t of the vane element 20v. Further, in terms of forming ability, a high level of precision is not required as compared with the conventional self-oscillation type spray nozzle, and therefore, the forming ability is superior, and even in a case where a distortion occurs, the flow path is less likely to be affected.

In the present embodiment, the nozzle 10 is made by combining the two upper and lower nozzle-divided bodies 20 having the same shape with each other. Therefore, the production cost of the nozzle-divided body 20 can be suppressed, and the assembly performance is significantly superior. In particular, in the present embodiment, the two nozzle-divided bodies 20 can be easily assembled in the vertical direction by using the projection portion 20q and the recessed portion 20r provided on the nozzle-divided body 20 and capable of engaging with each other.

In the present embodiment, due to the flat surface portion 20f provided on the nozzle-divided body 20, the dispersion of the liquid in the vertical direction can be suppressed, and the liquid spray can be effectively concentrated in the horizontal direction. Further, in the present embodiment, due to the groove pattern 20g provided on the flat surface portion 20f, the liquid spray can be concentrated in a desired direction and on a portion.

In the above embodiment, the engagement receiving hole 30a is provided in the nozzle body 30, and the engagement protrusion 20a is provided on the nozzle-divided body, but on the contrary, an engagement protrusion may be provided on the nozzle body, and an engagement receiving hole is provided in the nozzle-divided body. Alternatively, it may be possible to employ an engagement portion and an engagement receiving portion with a type different from the engagement protrusion and the engagement receiving hole. Further, instead of employing the engagement portion and the engagement receiving portion, it may be possible to employ a welding portion and a welding receiving portion. In this case, the interpolation of the O ring 40 can be omitted.

Figure 5:
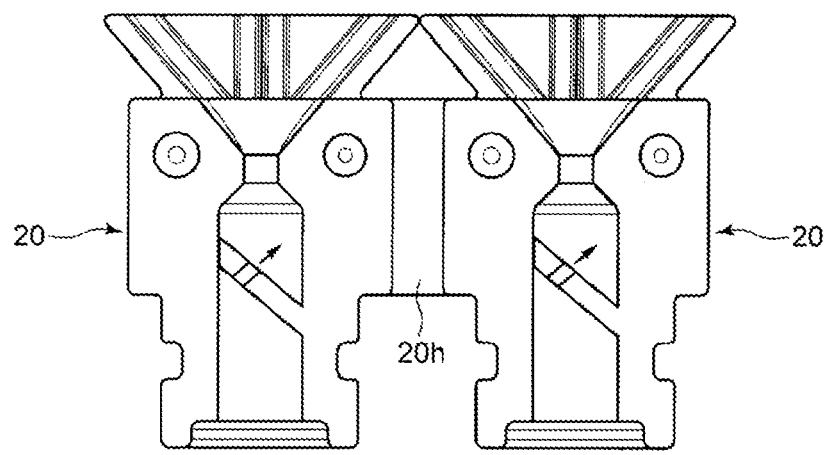
FIG. 5 is a schematic plan view illustrating an example in which two identical upper and lower nozzle-divided bodies are connected with a hinge.
Figure 6:
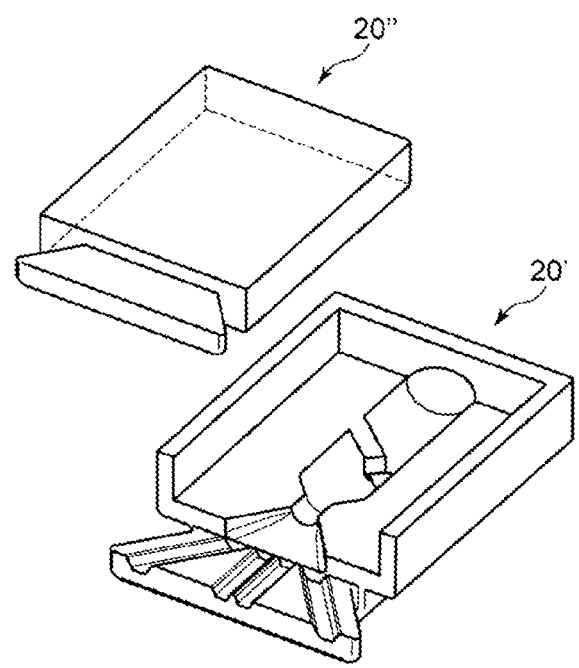
FIG. 6 is a schematic oblique perspective view illustrating an example in which one of two upper and lower nozzle-divided bodies is in a saucer shape, and the other is in a lid shape.

As illustrated in FIG. 5, when the two identical upper and lower nozzle-divided bodies 20 are hinge-connected with a hinge portion 20h in advance, the assembly performance is still better. Alternatively, as illustrated in FIG. 6, even when one of the two upper and lower nozzle-divided bodies 20' is in a saucer shape, and the other thereof 20" is in a lid shape, the assembly performance is still better.

Figure 7:
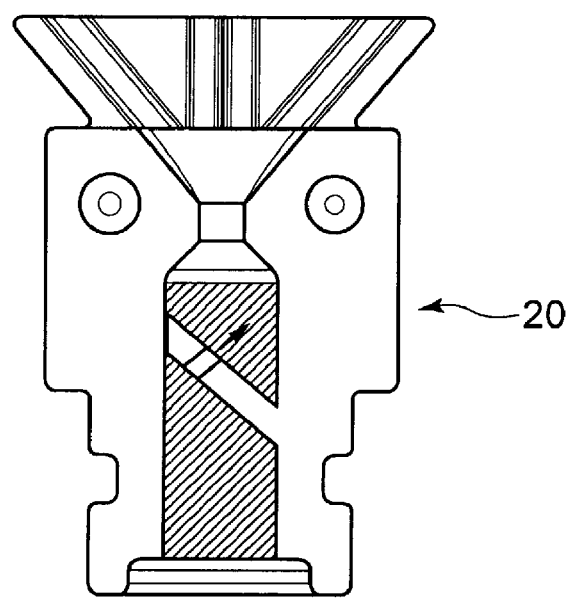
FIG. 7 is a schematic plan view for explaining a flow path element penetrating through a nozzle-divided body.

The flow path element 20w of the nozzle-divided body 20 is not limited to the structure in which the flow path element 20w of the nozzle-divided body 20 is formed inside of the nozzle-divided body 20 as shown in the embodiment. Alternatively, it may be possible to employ a structure in which the flow path element 20w of the nozzle-divided body 20 penetrates to the outside as illustrated in FIG. 7 (a hatched portion of FIG. 7 is penetrating). In this case, when the nozzle-divided body 20 and the nozzle body 30 are assembled, the flow path element 20w (flow path 11w) is sectioned by an inner wall surface of the nozzle body 30.

The nozzle 10 may be made by combining three or four nozzle-divided bodies 20.

The nozzle 10 and the nozzle body 30 may be assembled by press-fitting without using any O ring 40.

Figure 8A:
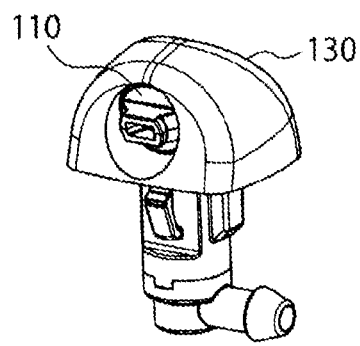
FIGS. 8(a) to 8(c) are figures illustrating a spray nozzle according to another embodiment of the present invention.
Figure 8B:
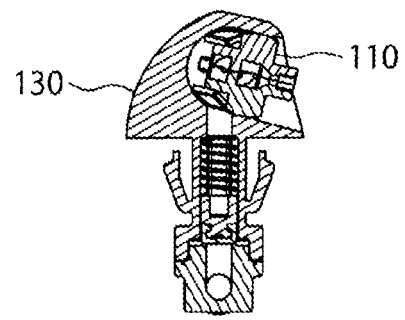
Figure 8C:
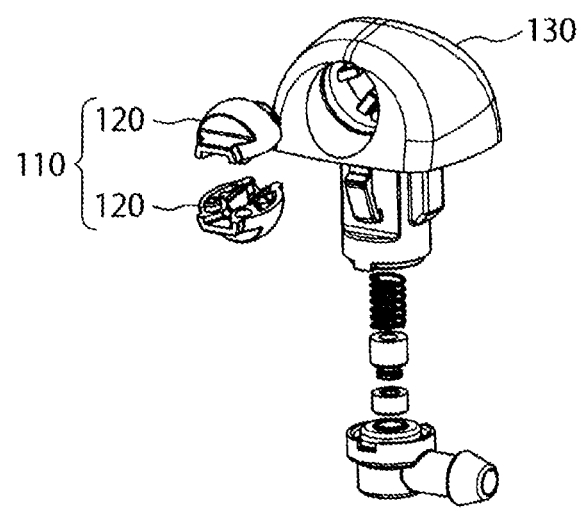

Further, a nozzle 110 is made into a spherical shape, to be able to rotate with respect to the nozzle body 130. Such embodiment is illustrated in FIGS. 8(a) to 8(c). FIGS. 8(a) to 8(c) are figures illustrating a spray nozzle according to such embodiment. FIG. 8(a) is an oblique perspective view, FIG. 8(b) is a vertical cross-sectional view, and FIG. 8(c) is an exploded view.

Figure 9:
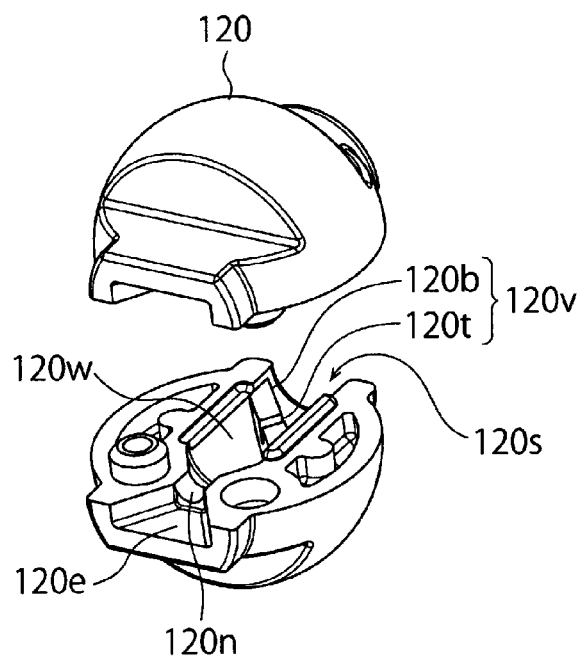
FIG. 9 is an enlarged view illustrating a nozzle-divided body of FIG. 8(c).

As illustrated in FIG. 8(c), the spherical nozzle 110 is constituted by, for example, two nozzle-divided bodies 120 in a substantially semi-spherical shape. FIG. 9 is an enlarged view illustrating a nozzle-divided body 120 of FIG. 8(c). As illustrated in FIG. 8(c) and FIG. 9, the nozzle-divided body 120 of the spray nozzle according to this embodiment has a shape obtained by dividing the nozzle 110 into two parts in the vertical direction so that the nozzle-divided bodies 120 have the same shape with each other. More specifically, the nozzle 110 can be made by combining the two nozzle-divided bodies 120 in the vertical direction.

As illustrated in FIG. 9, each of the nozzle-divided bodies 120 includes a supply port element 120s corresponding to the supply port and divided into two parts in the vertical direction, a spray orifice element 120e corresponding to the spray orifice and divided into two parts in the vertical direction, and a flow path element 120w corresponding to the flow path and divided into two parts in the vertical direction.

As illustrated in FIG. 9, the supply port element 120s is a substantially semi-circular opening, the spray orifice element 120e is an opening having a shape of a half of a substantially conical shape that has been crushed to be flat, and the flow path element 120w is a substantially semi-cylindrical groove channel extending linearly and having a diaphragm portion 120n and a blocking portion 120b on its way.

As illustrated in FIG. 9, the blocking portion 120b extends obliquely with respect to the direction of the flow path in order to block the liquid flowing in the flow path formed by combining the flow path elements 120w and make fluid flowing along the blocking portion 120b into a swirling flow. A penetrating portion 120t is provided to cross the blocking portion 120b. The vane element 120v is constituted by the blocking portion 120b and the penetrating portion 120t.

According to such embodiments, the spray angle of the nozzle 110 with respect to the nozzle body 130 can be adjusted to any angle. Therefore, for example, the spray angle or the spray position can be adjusted for each type of vehicles.

REFERENCE SIGNS LIST 10 nozzle
10s supply port
10w flow path
10e spray orifice
20, 20', 20" nozzle-divided body
20s supply port element
20w flow path element
20e spray orifice element
20v vane element
20b blocking portion
20t penetrating portion
20n diaphragm portion
20f flat surface portion
20p flat surface portion
20g groove pattern
20q projection portion
20r recessed portion
20a engagement protrusion
20h hinge portion
30 nozzle body
30a engagement receiving hole
40 O ring
110 nozzle
120 nozzle-divided body 120s supply port element
120w flow path element
120e spray orifice element
120v vane element
120b blocking portion
120t penetrating portion
120n diaphragm portion
130 nozzle body

What is claimed is:

1. A spray nozzle comprising:
   a nozzle including
      a pair of nozzle-divided bodies stacked together;
      a supply port formed from the pair of nozzle-divided bodies, for receiving liquid; and
      a spray orifice formed from the pair of nozzle-divided bodies and communicating with the supply port, for spraying the liquid,
   wherein each of the pair of nozzle-divided bodies has
      a flow path element extending from the supply port to the spray orifice for guiding the liquid in a flow direction,
      a vane element integrally formed in the flow path element, and including
         a blocking portion extending obliquely with respect to a direction of the flow path element and entirely across the flow path element, for blocking the liquid from the supply port to the spray orifice, and
         a penetrating portion penetrating the blocking portion, for guiding the liquid from the supply port to the spray orifice,
      a spray orifice element forming the spray orifice and arranged downstream of the vane element, the spray orifice element being an opening communicating with the supply port through the flow path element and having a shape of a half of a substantially conical shape with a diameter increasing toward a downstream of the nozzle, and
      a flat surface portion arranged downstream of the spray orifice element, for dispersing the liquid, the flat surface portion including a groove and another groove, for guiding the liquid from the spray orifice element, arranged opposite to each other with respect to a center axis of the nozzle and inclined away from each other toward a downstream side of the nozzle,
   the vane elements are configured so that the liquid flows along the blocking portions and through the penetrating portions to rotate the liquid provided from the supply port toward the spray orifice, and
   in a state in which the pair of nozzle-divided bodies is stacked together, the flat surface portions are arranged parallel to and spaced apart from each other to form a space therebetween for spraying the liquid from the spray orifice along a lateral direction, and the grooves on inner sides of the flat surface portions facing each other and the another grooves on the inner sides of the flat surface portions facing each other guide the liquid from the spray orifice.

2. The spray nozzle according to claim 1, wherein
   one of the nozzle-divided bodies is formed with one of a projection portion and a recessed portion capable of engaging with each other, and
   the other of the nozzle-divided bodies is formed with the other of the projection portion and the recessed portion.

3. The spray nozzle according to claim 1, wherein
   the nozzle is attached to a nozzle body,
   one of the nozzle body and the nozzle is formed with one of an engagement portion and an engagement receiving portion capable of engaging with each other, and
   the other of the nozzle body and the nozzle is formed with the other of the engagement portion and the engagement receiving portion.

4. The spray nozzle according to claim 1, wherein
   the nozzle is attached to a nozzle body,
   one of the nozzle body and the nozzle is formed with one of a welding portion and a welding receiving portion capable of being welded with each other, and
   the other of the nozzle body and the nozzle is formed with the other of the welding portion and the welding receiving portion.

5. The spray nozzle according to claim 1, wherein the blocking portions of the pair of nozzle-divided bodies incline opposite to each other in respect to the center axis of the nozzle.

6. The spray nozzle according to claim 1, wherein the blocking portions of the pair of nozzle-divided bodies intersect each other and form spaces between the pair of nozzle-divided bodies to allow the liquid from the supply port to flow therethrough and form a swirling flow toward the spray orifice.

7. The spray nozzle according to claim 1, wherein each of the blocking portions inclines with respect to the center axis of the nozzle, and each of the penetrating portions is formed on the blocking portion at a position deviating from the center axis.

8. The spray nozzle according to claim 1, wherein the groove and the another groove are concaves formed on the inner side of the flat surface portion.

9. The spray nozzle according to claim 8, further comprising a center groove extending linearly along the direction of the flow path at a center portion of the flat surface portion,
   wherein the groove and the another groove extend linearly at sides of the center groove and are inclined with respect to the center groove.

10. The spray nozzle according to claim 9, wherein the flat surface portion is spread laterally toward the downstream side of the nozzle so that the liquid from the spray orifice is sprayed along the lateral direction.

11. A spray nozzle comprising:
    a nozzle including
       a pair of nozzle-divided bodies stacked together;
       a supply port formed from the pair of nozzle-divided bodies, for receiving liquid; and
       a spray orifice formed from the pair of nozzle-divided bodies and communicating with the supply port, for spraying the liquid,
    wherein each of the pair of nozzle-divided bodies has
       a flow path element extending from the supply port to the spray orifice for guiding the liquid in a flow direction,
       a vane element integrally formed in the flow path element, and including
          a blocking portion extending obliquely with respect to a direction of the flow path element and entirely across the flow path element, for blocking the liquid from the supply port to the spray orifice, and
          a penetrating portion penetrating the blocking portion, for guiding the liquid from the supply port to the spray orifice,
       a spray orifice element forming the spray orifice and arranged downstream of the vane element, the spray orifice element being an opening communicating with the supply port through the flow path element and having a shape of a half of a substantially conical shape with a diameter increasing toward a downstream of the nozzle, and a flat surface portion arranged downstream of the spray orifice element, for dispersing the liquid, the flat surface portion including a groove for guiding the liquid from the spray orifice element, the vane elements are configured so that the liquid flows along the blocking portions and through the penetrating portions to rotate the liquid provided from the supply port toward the spray orifice, in a state in which the pair of nozzle-divided bodies is stacked together, the flat surface portions are arranged parallel to and spaced apart from each other to form a space therebetween for spraying the liquid from the spray orifice along a lateral direction and the grooves on inner sides of the flat surface portions facing each other guide the liquid from the spray orifice, the blocking portions of the pair of nozzle-divided bodies incline opposite to each other in respect to a center axis of the nozzle, the blocking portions of the pair of nozzle-divided bodies intersect each other and form spaces between the pair of nozzle-divided bodies to allow the liquid from the supply port to flow therethrough and form a swirling flow toward the spray orifice, each of the blocking portions inclines with respect to the center axis of the nozzle, and each of the penetrating portions is formed on the blocking portion at a position deviating from the center axis the flat surface portion further comprises another groove for guiding the liquid from the spray orifice element, and the groove and the another groove of the flat surface portion are arranged opposite to each other with respect to the center axis of the nozzle and inclined away from each other toward a downstream side of the nozzle.

* * * * *